United States Patent [19]
Eberhardt et al.

[11] Patent Number: 6,094,138
[45] Date of Patent: Jul. 25, 2000

[54] INTEGRATED CIRCUIT ASSEMBLY AND METHOD OF ASSEMBLY

[75] Inventors: Noel H. Eberhardt, Cupertino; Victor Allen Vega, Hercules, both of Calif.

[73] Assignee: Motorola, Inc., Schaumburg, Ill.

[21] Appl. No.: 09/152,201

[22] Filed: Sep. 11, 1998

Related U.S. Application Data

[63] Continuation-in-part of application No. 09/031,848, Feb. 27, 1998, which is a continuation-in-part of application No. 09/041,480, Mar. 12, 1998, which is a continuation-in-part of application No. 09/045,357, Mar. 20, 1998.

[51] Int. Cl.[7] .................................................. G08B 13/181
[52] U.S. Cl. .................... 340/572.1; 29/25.01; 29/592.1; 29/601; 29/DIG. 1; 340/825.34; 340/825.54
[58] Field of Search ........................... 340/572.1, 825.34, 340/825.54; 29/25.01, 592.1, 601, DIG. 1

[56] References Cited

U.S. PATENT DOCUMENTS

| 5,528,222 | 6/1996 | Mokowitz et al. | 340/572.1 |
| 5,786,626 | 7/1998 | Brady et al. | 257/673 |

*Primary Examiner*—Glen Swann
*Attorney, Agent, or Firm*—Terri S. Hughes

[57] ABSTRACT

An integrated circuit assembly (12) such as used on a radio frequency identification tag, or other device, includes an integrated circuit (14) coupled to first and second printed conductors (16a) and (16b), such as tag electrodes, on a flexible substrate (18). The printed conductors (16a and 16b) may be conductors in the form of printed ink electrostatic antennas. The integrated circuit (14), is disposed in a generally co-planar arrangement with the flexible substrate (18). That is, the integrated circuit (14) is positioned in-line with the flexible substrate (18).

20 Claims, 2 Drawing Sheets

INTEGRATED CIRCUIT ASSEMBLY AND METHOD OF ASSEMBLY

CROSS REFERENCE TO RELATED APPLICATIONS

This is a continuation-in-part of commonly assigned prior U.S. patent application Ser. No. 09/031,848, filed Feb. 27, 1998 by Victor Allen Vega et al., titled, "Radio Frequency Identification Tag System Using Tags Arranged for Coupling to Ground," the disclosure of which prior application is hereby incorporated by reference, verbatim and with the same effect as though it were fully and completely set forth herein.

Also, this is a continuation-in-part of commonly assigned prior U.S. patent application Ser. No. 09/041,480, filed Mar. 12, 1998 by Victor Allen Vega et al., titled, "Radio Frequency Identification Tag Arranged for Magnetically Storing Tag State Information," the disclosure of which prior application is hereby incorporated by reference, verbatim and with the same effect as though it were fully and completely set forth herein.

Also, this is a continuation-in-part of commonly assigned prior U.S. patent application Ser. No. 09/045,357, filed Mar. 20, 1998 by Victor Allen Vega, titled, "Radio Frequency Identification Tag with a Programmable Circuit State," the disclosure of which prior application is hereby incorporated by reference, verbatim and with the same effect as though it were fully and completely set forth herein.

FIELD OF THE INVENTION

The invention relates generally to integrated circuit assemblies and more particularly to integrated circuit assemblies that attach an integrated circuit to a flexible substrate, such as paper or other thin material.

BACKGROUND OF THE INVENTION

Conventional attachment techniques for attaching an integrated circuit to a conductor on a flexible substrate to form an integrated circuit assembly, includes wire bonding wires from an integrated circuit to metal pads. Also, typical wire bonding techniques generally require use of low impedance metal pads. A problem arises with such techniques with newly used flexible substrates such as paper and other thin substrates. Paper substrates, and other types of substrates may be used, for example, with electrostatic radio frequency identification (RFID) tags which may be disposable identification tags such as baggage claim tickets and other disposable tags. One example of an electrostatic RFID tag is disclosed in a co-pending application entitled "Remotely Powered Electronic Tag and Associated Exciter/Reader and Related Method," having Ser. No. 08/540,813, filed Oct. 11, 1995, as abandoned by Ted Geiszler et al., and is hereby incorporated herein, in its entirety, by reference. Also, with flexible substrates such as mylar, acetate or paper substrates, it can be difficult to reliably mount metal pads on to the substrate.

Other conventional integrated circuit assembly techniques include using a flip chip configuration for the integrated circuit. With flip chips, protrusions or posts typically extend from a surface of a flip chip. The protrusion rests on top of the substrate. Conductive adhesive epoxy is then typically applied around the protrusion and non-conductive adhesive is injected as under-fill between the bottom of the integrated circuit and the substrate. However with such attachment techniques, the integrated circuit must typically mount above the plane of the substrate. With RFID tags and similar communication devices, it is necessary to reduce costs and size of the unit. As such, paper being a relatively inexpensive substrate, has been proposed as being used. Moreover, the RFID tags should be as flat as possible to allow ease in printing graphics and other information on the substrate. A problem can arise with the mounting of integrated circuits above the plane of the paper since the additional height of the integrated circuit may allow the integrated circuit to be unnecessarily damaged during the printing process or other fabrication process. In addition, with typical flip chip assemblies, a wet epoxy adhesive is typically used to attach the protruding bumps of the integrated circuit to the substrate. This can require long cure times at high temperatures, slowing down the fabrication process. Also, such die attachment techniques can also be prone to cracks and damage when the substrate is flexed due to the rigidity of the cured adhesive.

Consequently, there exists a need for an integrated circuit assembly that suitably mounts integrated circuits to low cost flexible substrates.

DETAILED DESCRIPTION OF THE PREFERRED EMBODIMENTS

Figure 1:
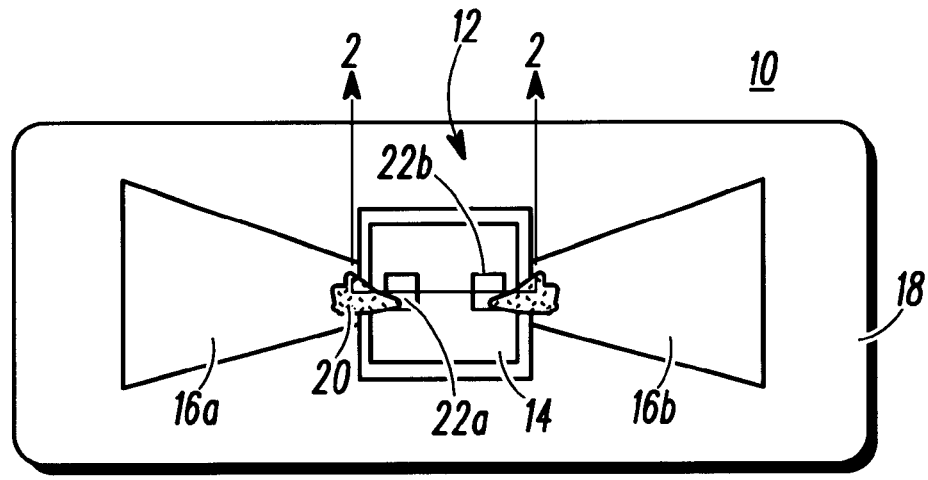
FIG. 1 is a plan view of a radio frequency identification tag employing an integrated circuit assembly in accordance with one embodiment of the invention.

FIG. 1 shows a radio frequency identification (RFID) tag 10 employing an integrated circuit assembly 12. The radio frequency identification tag 10 includes an RFID silicon integrated circuit 14, or other suitable integrated circuit, coupled to first and second printed conductor 16a and 16b, such as tag electrodes. The printed conductors 16a and 16b are conductors in the form of printed ink electrostatic antennas. As shown, the RFID tag 10 includes a flexible substrate 18 together with a first tag electrode in the form of the printed conductor 16a and second tag electrode in the form of the printed conductor 16b being disposed on the flexible substrate 18. However, any suitable conductor and conductor attachment technique may be used.

The radio frequency identification tag 10 may be for example, an electrostatic RFID tag for use in disposable identification tag applications. However any suitable device may employ the disclosed integrated circuit assembly. The integrated circuit 14 is electrically coupled to the printed conductors 16a and 16b using an isotropic electrically conductive material 20.

Figure 2:
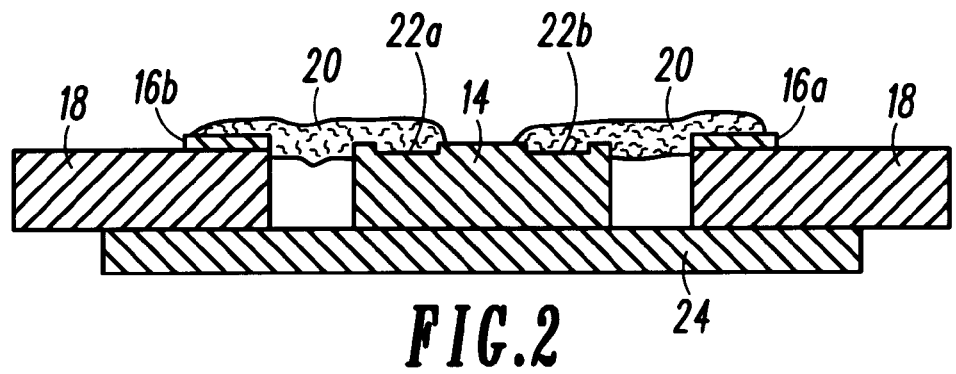
FIG. 2 is a cross sectional view of FIG. 1 illustrating one embodiment of an integrated circuit assembly in accordance with the invention.

Referring to FIG. 2, the integrated circuit 14, such as an RFID tag integrated circuit, is disposed in a generally co-planar arrangement with the flexible substrate 18. That is, the integrated circuit 14 is positioned in-line with the flexible substrate 18 as opposed to on top of the substrate. The flexible substrate 18 may be, for example, paper, mylar, acetate, polyester, polyimide, PVC, polycarbonate, woven fabric made from cotton, polyester combinations of these materials or any other suitable flexible substrate material.

The isotropic electrically conductive material 20 may be a pressure sensitive conductive adhesive such as type 333-1 manufactured by Ablestik, Rancho Dominguez, Calif. However, any other suitable isotropic material may also be used including, for example, pressure sensitive conductive tape. The isotropic electrically conductive material 20 is coupled between each of the conductors 16a and 16b and a conductive pad 22a and 22b on the integrated circuit 14 to form an electrical connection between one pad and one conductor. As shown, the two conductors, 16a and 16b are electrically isolated from one another. However depending upon on the application for which the disclosed integrated circuit assembly is being used, the conductors may be coupled in any suitable manner to the integrated circuit. Also, in this particular embodiment, the assembly includes non-conductive backing tape 24 attached to the flexible substrate 18 and to a surface of the co-planar integrated circuit 14. The non-conductive backing tape 24 may have an adhesive surface on both a top surface and a bottom surface thereof so that the assembly may be attached to another layer of material such as a laminate, or label if desired.

As shown, each conductor 16a and 16b is a printed antenna formed of conductive ink on a paper substrate. The integrated circuit 14 includes an electrostatic receiving circuit which is coupled to the printed antenna through the isotropic electrically conductive material 20. An example of such an integrated circuit, may be found for example in the previously mentioned co-pending application Ser. No. 08/040,813 titled "Remotely Powered Electronic Tag and Associated Exciter/Reader and Related Method."

The in-line or co-planar arrangement of the integrated circuit 14 with the flexible substrate 18 allows the outer surface of the assembly to be very flat. This can allow improved reliability when additional print is applied to the substrate. For example, with electrostatic RFID tags, using paper as the substrate, additional graphics and other print may be applied directly to the substrate by a print head. A roller or other transport mechanism is less likely to damage the integrated circuit if it is in-line with the substrate. In addition, the use of a substrate such as paper can significantly lower the cost of the integrated circuit assembly. Moreover, the use of the pressure sensitive adhesive can also substantially reduce the fabrication costs since application of the adhesive is relatively easy compared to a die bonding operations or flip chip attachment methods.

Figure 3A:
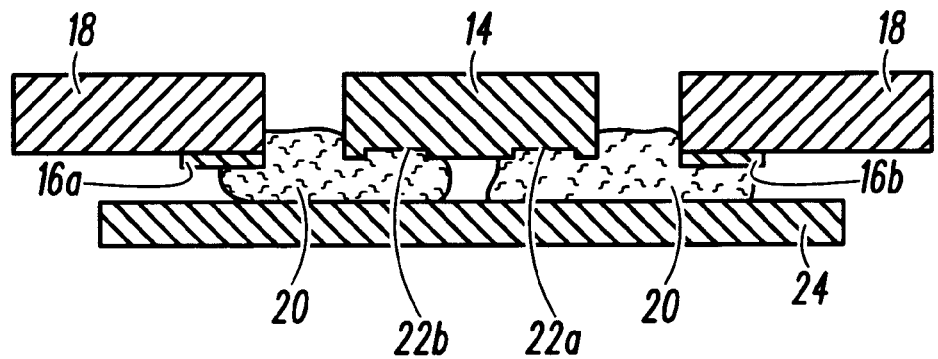
FIG. 3A is a cross sectional view of an alternative embodiment of integrated assembly in accordance with the invention.
Figure 3B:
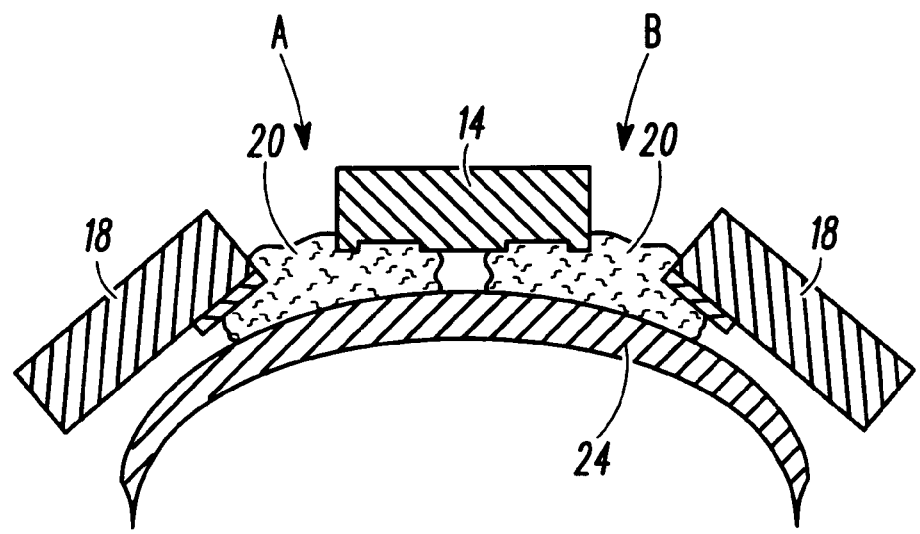
FIG. 3B is the integrated circuit assembly of FIG. 3A shown in a flexed position.

Referring to FIG. 3A and FIG. 3B, an alternative embodiment of an integrated circuit assembly uses a non-conductive backing tape 24 to cover the isotropic electrically conductive material 20. As the flexible substrate 18 is flexed, the isotropic electrically conductive material 20 flexes with the non-conductive backing tape 24 thereby reducing stress on the electrical and mechanical bond formed by the isotropic electrically conductive material with the integrated circuit 14 and flexible substrate 18.

As an alternative embodiment, the isotropic electrically conductive material 20 may be pressure sensitive conductive tape which includes non-conductive portions to facilitate selective non-conductivity. The non-conductive portions may be, for example, in the areas indicated by arrows A and B in FIG. 3B. For example, two electrically separated rows of conductive tape or ribbon may simplify the assembly process by preventing adjacent conductors from contacting and shorting together. The use of pressure sensitive conductive tape with non-conductive portions can facilitate faster fabrication.

Fabrication of the integrated circuit assembly 12 (FIG. 1) for radio frequency identification tags or other devices may be carried out by locating an integrated circuit in a co-planar manner with a substrate that supports at least one conductor. The isotropic electrically conducted material is then applied between the integrated circuit and the at least one conductor to form an electrical connection there between. If desired, a non-conductive layer of material, such as non-conductive tape may be applied to the isotropic electrically conducted material as shown in FIG. 3A and FIG. 3B. Additional layer of material can be applied to the substrate and to the surface of the coplanar integrated circuit to provide slightly more rigidity. It will be recognized that additional layers of material such as laminates and/or multiple layers of substrate material or other material may also be used, if desired, depending upon the particular application.

The invention may find particular application with electrostatic RFID tags since such tags may utilize printed paper as substrate material which can result in significant cost reductions compared with other types of integrated circuit assemblies. Moreover, such IC's, being primarily memory based, can be relatively thin which can allow suitable co-planar arrangement. In addition, the conductors may be of a relatively high impedance. This is in contrast to many conventional integrated circuit attachment assemblies which utilize low impedance conductors. As such, lower cost circuits may be used. However, the invention is in no way limited to high impedance conductors or electrostatic RFID tags, but may find use in any suitable application utilizing flexible conductor substrates.

It should also be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. An integrated circuit (IC) assembly comprising:
   a flexible substrate, having a thickness that defines a plane, supporting at least one conductor;
   an integrated circuit disposed in a coplanar arrangement with the flexible substrate, wherein the integrated circuit is substantially within the plane; and
   isotropic electrically conductive material coupled between the conductor and the integrated circuit to form an electrical connection therebetween.

2. The IC assembly of claim 1 wherein the flexible substrate is made from at least one of: acetate, polyester, polyimide, PVC, woven fabric and polycarbonate.

3. The IC assembly of claim 1 wherein the assembly is a radio frequency identification tag.

4. The IC assembly of claim 3 wherein the at least one conductor is a printed antenna formed of conductive ink on the substrate and the integrated circuit includes an electrostatic receiving circuit operatively coupled to the printed antenna.

5. The IC assembly of claim 1 wherein the at least one conductor is a printed antenna and the substrate is paper.

6. The IC assembly of claim 1 wherein the isotropic electrically conductive material includes pressure sensitive conductive adhesive.

7. The IC assembly of claim 1 including nonconductive tape attached to the isotropic conductive material.

8. An integrated circuit (IC) assembly comprising:
   a flexible substrate, supporting at least one conductor, wherein the flexible substrate includes paper;

an integrated circuit disposed in a coplanar arrangement with the flexible substrate; and isotropic electrically conductive material coupled between the conductor and the integrated circuit to form an electrical connection therebetween.

9. An integrated circuit (IC) assembly comprising:

a flexible substrate supporting at least one conductor;

an integrated circuit disposed in a coplanar arrangement with the flexible substrate, and isotropic electrically conductive material coupled between the conductor and the integrated circuit to form an electrical connection therebetween, wherein the isotropic electrically conductive material includes pressure sensitive conductive tape.

10. The IC assembly of claim 9 wherein the pressure sensitive conductive tape includes nonconductive portions to facilitate selective non-conduction.

11. An integrated circuit (IC) assembly comprising:

a flexible substrate supporting at least one conductor;

an integrated circuit disposed in a coplanar arrangement with the flexible substrate, and isotropic electrically conductive material coupled between the conductor and the integrated circuit to form an electrical connection therebetween, wherein non-conductive tape is attached to the flexible substrate and to a surface of the coplanar integrated circuit.

12. An integrated circuit (IC) assembly comprising:

a flexible substrate supporting at least two conductors formed from conductive ink;

an integrated circuit disposed in a coplanar arrangement with the flexible substrate; and isotropic electrically conductive material coupled between the at least two conductors and the integrated circuit to form an electrical connection therebetween such that the two conductors are electrically isolated from one another and each conductor is electrically coupled with the integrated circuit.

13. The IC assembly of claim 12 wherein the IC assembly is a radio frequency identification tag.

14. The IC assembly of claim 12 wherein the at least two conductors are printed antennas and the substrate is paper.

15. The IC assembly of claim 14 wherein the at least two conductors are printed antennas formed of conductive ink on the substrate and the integrated circuit includes an electrostatic receiving circuit operatively coupled to the printed antennas.

16. The IC assembly of claim 12 wherein the isotropic electrically conductive material includes pressure sensitive conductive adhesive.

17. The IC assembly of claim 12 wherein the isotropic electrically conductive material includes pressure sensitive conductive tape.

18. A method of making an IC assembly comprising the steps of:

locating an integrated circuit in a co-planar manner with a substrate that supports at least one conductor, wherein the substrate has a thickness that defines a plane and the integrated circuit is substantially within the plane; and applying an isotropic electrically conductive material between the integrated circuit and the at least one conductor to form an electrical connection therebetween.

19. The method of claim 18 including the step of applying a nonconductive layer of material to the isotropic electrically conductive material.

20. The method of claim 18 including the step of applying a nonconductive layer of material to the substrate and to a surface of the integrated circuit located in a co-planar manner with the substrate.

* * * * *